United States Patent [19]

Freitus

[11] Patent Number: 4,937,972
[45] Date of Patent: Jul. 3, 1990

[54] SELF-CONTAINED PLANT GROWTH SYSTEM

[76] Inventor: Joseph P. Freitus, Box 424, 36 Town Forest Rd., West Groton, Mass. 01472

[21] Appl. No.: 324,171

[22] Filed: Mar. 16, 1989

[51] Int. Cl.$^5$ .............................................. A01G 31/02
[52] U.S. Cl. .......................................... 47/62; 47/79
[58] Field of Search .................. 47/79, 59, 60, 61, 62, 47/63, 64, 48.5

[56] References Cited

U.S. PATENT DOCUMENTS

| | | | |
|---|---|---|---|
| 2,278,991 | 4/1942 | Hasslacher et al. | 47/79 X |
| 2,306,027 | 12/1942 | Swarey | 47/79 |
| 2,674,828 | 4/1954 | Tegner | 47/79 X |
| 3,168,797 | 2/1965 | Patassy | 47/79 |
| 3,293,799 | 2/1964 | Keller et al. | 47/38 |
| 3,590,335 | 6/1971 | Tetar | 47/48.5 X |
| 3,738,060 | 6/1973 | Jullien-Davin | 47/38.1 |
| 3,825,126 | 7/1974 | Pohl | 47/86 X |
| 3,900,134 | 8/1975 | Larson | 222/52 |
| 3,981,446 | 9/1976 | Hunter | 47/79 X |
| 3,991,939 | 11/1976 | Maclay | 47/48.5 X |
| 4,020,417 | 4/1977 | Brehob | 47/79 X |
| 4,056,899 | 11/1977 | Close | 47/79 |
| 4,060,934 | 12/1977 | Skaggs | 47/79 |
| 4,148,155 | 4/1979 | Allen | 47/59 |
| 4,149,340 | 4/1979 | Da Vitoria-Lobo | 47/79 |
| 4,175,354 | 11/1979 | Anderson | 47/79 X |
| 4,185,414 | 1/1980 | Miller | 47/62 |
| 4,189,867 | 2/1980 | Schneck | 47/79 X |
| 4,242,835 | 1/1981 | Sorribes | 47/84 |
| 4,300,311 | 11/1981 | Marchant | 47/79 X |
| 4,321,937 | 3/1982 | Littlehale | 137/78.3 |
| 4,334,386 | 6/1982 | Burcombe et al. | 47/62 |
| 4,447,983 | 5/1984 | Shinada | 47/79 X |
| 4,527,354 | 7/1985 | Sellier | 47/81 |
| 4,542,762 | 9/1985 | Littlehale | 137/78.3 |
| 4,557,071 | 12/1985 | Fah | 47/81 |

FOREIGN PATENT DOCUMENTS 2813410 10/1979 Fed. Rep. of Germany .......... 47/59

Primary Examiner—Henry E. Raduazo
Assistant Examiner—Jerrold D. Johnson
Attorney, Agent, or Firm—Lahive & Cockfield

[57] ABSTRACT

Self-contained plant growth systems include a three-compartment plant growth chamber having an upper compartment for holding soil or vermiculite, an intermediate reservoir compartment for storing fluid—such as a plant growth solution—and a lower compartment housing a pump and electric power source. Responsive to signals from a water sensor in the upper compartment, the pump is activated for pumping a metered quantity of growth solution along a feeder tube from the reservoir compartment to the upper compartment. Drainage is provided from the upper compartment to the reservoir. A vent tube vents air to and from the reservoir during emptying and filling operations. An on/off switch selectively de-activates the pump, and the chamber can include elements for displaying reservoir fluid level.

15 Claims, 1 Drawing Sheet

SELF-CONTAINED PLANT GROWTH SYSTEM

BACKGROUND OF THE INVENTION

This invention relates generally to methods and apparatus for tending plants, and, more particularly, relates to automatic, self-contained apparatus for sustaining plant growth.

A growing number of residential, commercial, and scientific establishments have extensive horticultural developments which require frequent monitoring and irrigation. This activity is labor-intensive, and in commercial sites, can represent a significant component of overhead cost. In the residential setting, individuals who are often away from their living space for extended periods of time cannot maintain the watering cycles of various plants in their homes, and face the possibility of damage to their plants, or the necessity of having others tend their plants. Practitioners in the field of plant research, especially in the area of hydroponics, have long recognized a need for a self-contained automatic plant tending unit.

Many plant tending systems have been proposed, and a number of automatic plant watering and feeding devices are known in the art. The following U.S. patents provide examples of such devices:

| | |
|---|---|
| 3,293,799 | Keller et al |
| 3,738,060 | Jullien-Davin |
| 3,900,134 | Larson |
| 4,060,934 | Skaggs |
| 4,148,155 | Allen |
| 4,149,340 | DaVitoria-Lobo |
| 4,185,414 | Miller |
| 4,242,835 | Sorribes |
| 4,321,937 | Littlehale |
| 4,334,386 | Burcombe et al |
| 4,527,354 | Sellier |
| 4,542,762 | Littlehale |
| 4,557,071 | Fah |

Keller et al discloses a device for automatic irrigation of plant growth chambers. When the weight of a plant growth chamber decreases below a selected point due to evaporation, valve actuation elements permit fluid to flow under the influence of gravity into the chamber.

Jullien-Davin discloses a device including a water tank adapted to support a conventional earth-filled pot, an electric pump, and associated water conduits. Water is propelled by the pump from the tank to a discharge tube having a porous intermediate section. A textile wick, in contact with the porous part of the discharge tube, conducts water by capillary action from the porous section of the tube to the earth in the pot.

Allen discloses apparatus including a pot and a sealable nutrient solution reservoir connected by a tube disposed at a selected height above the bottom of the pot. An air vent communicates with the tube, allowing air to enter the sealed reservoir when the level of nutrient solution in the pot falls below the end of the tube. This relieves vacuum in the reservoir, allowing fluid to flow into the pot until the end of the tube is again covered.

Sorribes discloses a plant growth container unit including a soil-containing receptacle surrounded by a water reservoir. A small orifice in the receptacle allows water to pass from the reservoir to the soil in the receptacle.

Burcombe et al discloses a modular hydroponic gardening system having a sump tank and plural grow tanks. Liquid is fed from the sump tank to the grow tanks by a pump located outside the sump tank.

Sellier discloses a reservoir for use with conventional plant containers for providing automatic watering capability. Water or plant nutrient solution is drawn from the reservoir by capillary wicks which contact the soil and extend into the reservoir through orifices. A feed tube is provided in communication with the reservoir for replenishing the fluids in the reservoir. The feed tube includes a float for permitting visual observation of fluid level in the reservoir.

Fah discloses a watering and feeding system for providing automatically measured amounts of water and nutrients to plants embedded in soil atop a water reservoir. Water is transported from the reservoir to the soil by capillary wicks. A water level indicator is provided.

Larsen, Skaggs, DaVitoria-Lobo, Miller, and Littlehale disclose various automatic water delivery systems.

Conventional plant watering devices, however, are generally complex and bulky. Such devices, for example, cannot conveniently be suspended without reinforced supporting structures. Certain devices, among those discussed above, depend upon capillary action to conduct water to the plants, a mechanism of water transport which can be unreliable. Other conventional plant watering devices require external sources of power for operations such as water transport, and thus cannot be self-contained. Moreover, conventional plant watering devices are often expensive, and, notwithstanding their automatic features, are inconvenient to service and refill.

It is accordingly an object of the invention to provide self-contained plant growth systems which operate without the requirement of external monitoring or external sources of power.

It is another object of the invention to provide such systems which are reliable, and convenient to operate and service.

It is a further object of the invention to provide such systems which are compact, robust and inexpensive.

Other general and specific objects of the invention will in part be obvious and will in part appear hereinafter.

SUMMARY OF THE INVENTION

The foregoing objects are attained by the invention, which provides self-contained plant growth systems, including a three-compartment plant growth chamber having a growth compartment for holding a plant and a support medium, a reservoir compartment for storing fluid, and a power compartment housing a pump and electric power source. In response to signals from a fluid quantity sensor in the growth compartment, the pump is activated for pumping a metered quantity of growth solution along a feeder tube from the reservoir compartment to the growth compartment.

The support medium in the growth compartment can include soil or vermiculite, for providing mechanical or biological support for the plant, and for absorbing fluid pumped into the growth compartment. Moreover, the stored fluid can include nutrient and fertilizer components, such as those utilized in connection with hydroponic horticulture.

The invention can include elements for providing drainage from the upper compartment to the reservoir, and a tube for venting air to and from the reservoir during emptying and filling operations. An on/off switch selectively de-activates the pump, and the chamber can include elements for displaying reservoir fluid level.

In another aspect of the invention, the electric power source includes storage batteries, which can be of the rechargeable type, and electrical connection elements for coupling an external power source to permit recharging of the storage batteries. The power source elements can also include display elements for indicating the condition of the storage batteries.

In a further aspect of the invention, the growth chamber housing includes modular coupling elements for connecting a plurality of such growth chambers in series, to form an array of self-contained plant growth chambers.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

Figure 1:
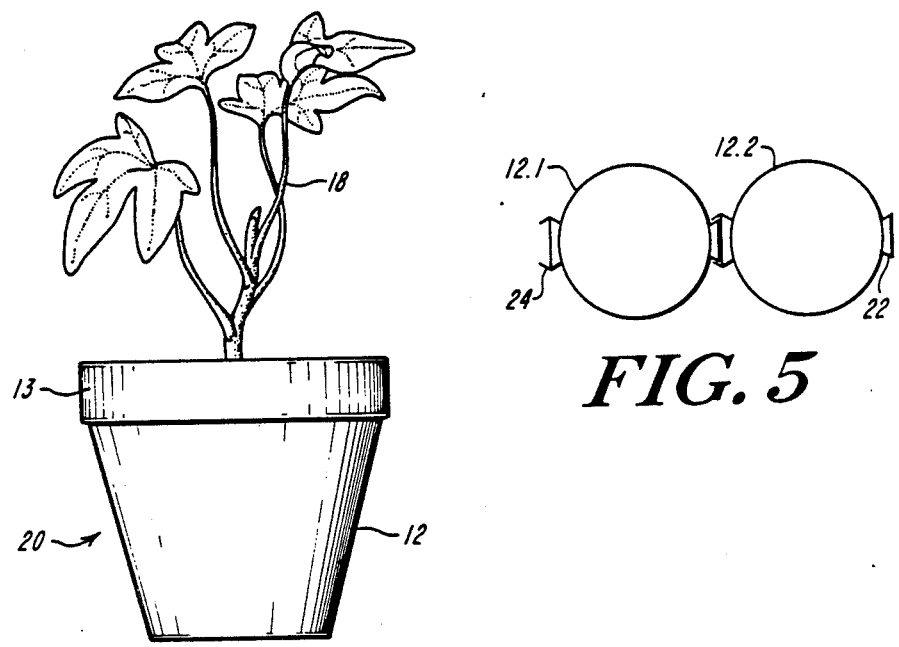
FIG. 1 is a schematic diagram depicting a plant growth chamber constructed in accordance with the invention.
Figure 2:
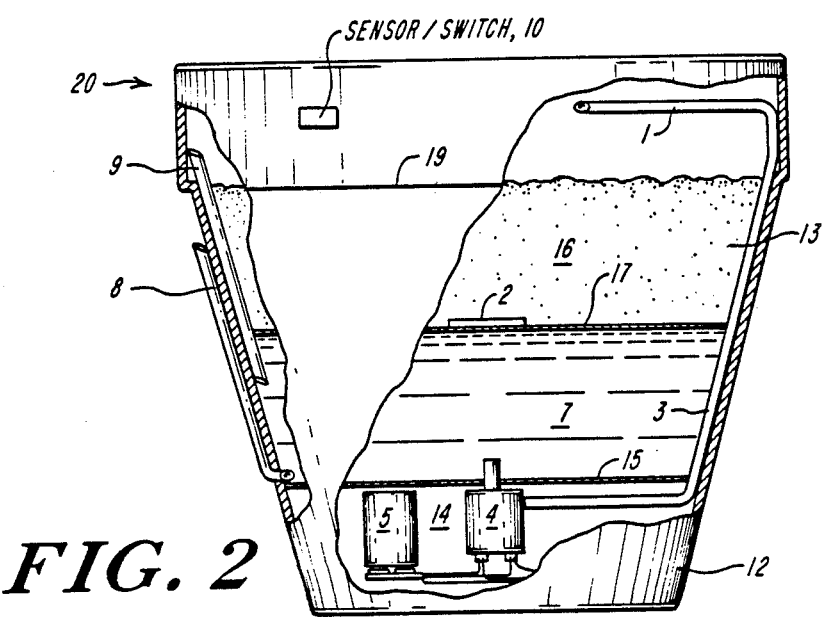
FIG. 2 is a side view of the chamber of FIG. 1, partially cut away, showing the multi-level compartmentalized construction of the chamber.

FIGS. 1 and 2 depict a plant growth chamber 20 constructed in accordance with the invention. The chamber 20 supports and sustains a plant 18, and includes vertically stacked upper, intermediate, and lower compartments defined by horizontal divider elements 19, 17, and 15, respectively, formed in a housing 12. The external configuration of housing 12 is not critical, and can be generally cylindrical, polyhedral, or frusto-conical. The housing 12 can be formed of any suitable material, such as aluminum, ceramic, or plastic. The growth compartment, reservoir compartment and power compartment can be provided, for example, by providing a conventional plant container with suitable divider elements 10, 17 and 15.

In one embodiment of the invention, the upper, intermediate, and lower compartments, respectively, define a growth compartment 16, reservoir compartment 7, and power compartment 14. The growth compartment houses the plant 18 and a supporting medium 13 for mechanical or biological support of the plant 18. In particular, the upper growth compartment can contain soil, vermiculite, or another appropriate growth medium which provides support for the plant, and which can absorb water or other selected fluid nutrient solutions.

The reservoir compartment 7 contains a selected fluid, which can include water and selected nutrient and fertilizer components necessary for plant growth. This plant nutrient mixture can be one suitable for hydroponic growth of plant 18.

Figure 3:
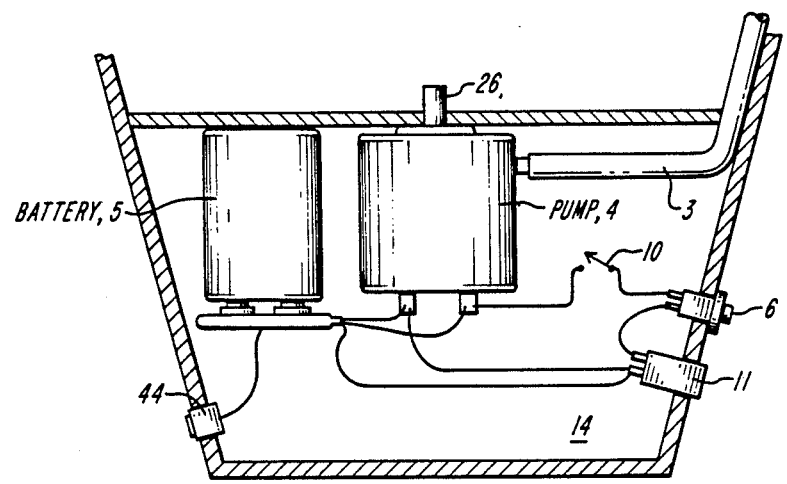
FIG. 3 depicts power source and pump elements contained in the lower compartment of the chamber of FIG. 1.

The power compartment 14, details of which are illustrated in FIG. 3, can house a conventional miniature pump 4 and a power source 5, for transport of fluid from the reservoir compartment to the growth compartment. Referring to FIGS. 1-3, liquid from the reservoir compartment 7 enters the pump 4 through pump inlet conduit 26. A feed conduit 3 connects the pump 4 to the upper growth compartment 16, for conducting the fluid from the reservoir compartment to the growth compartment when pump 4 is activated. A feeder tube extension 1, coupled to conduit 3, enters into the growth compartment 16 to deliver fluid to the growth compartment 16.

The pump 4 can be one which operates on an input voltage range of approximately 1.5 volts DC to approximately 24 volts DC. The criteria for selecting pump 4 include the size of the growth chamber and the pumping rate requirements. The pump 4 can be powered by a self-contained power source, such as a storage battery 5. This storage battery can be selected to produce an output voltage of 1.5-24 VDC, depending upon the demands of the pump.

In operation, soil, vermiculite, or another appropriate fluid-retentive medium 13 can be utilized to support the plant 18 in a selected position in the growth compartment 16. The fluid quantity sensor 10 can be placed into this supporting medium 13. Plant nutrients can be added to the liquid in the reservoir compartment 7, either prior to, or following, the introduction of plants into the supporting medium 13. The sensor 10 monitors the quantity of fluid in the growth compartment 16 and signals the pump 4 to initiate fluid transport when fluid quantity falls below a selected value. The pump 4 transports the fluid to growth compartment 16, until the sensor 10 detects a selected quantity of water and causes termination of the irrigation operation.

Figure 4:
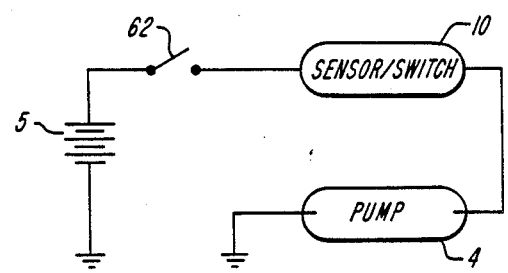
FIG. 4 is a schematic diagram depicting the circuit formed by the power source, sensor, and pump elements of FIG. 2.

In particular, referring to FIGS. 2 and 4, the sensor/switch assembly 10 can be disposed inside growth compartment 16, for sensing the quantity of fluid contained in the growth compartment 16 and generating a fluid-level signal representative of the fluid quantity. Sensor/switch assembly 10 can include a conventional normally-open switch element which isolates pump 4 from power source 5, and which responds to a selected value of the fluid-quantity signal by closing, thus causing power to be applied to pump 4. Accordingly, when a selected value of fluid quantity is attained, indicative of a need for irrigation, the fluid quantity sensor activates the pump until a required fluid quantity is attained.

The sensor element can be conventional in design and construction, and can include resistive, capacitive, optical or other detectors for sensing the level of fluid in the growth compartment 16. Alternatively, a conventional electronic moisture sensor can be utilized, for measuring the quantity of moisture contained in the medium 13 contained in the growth compartment 16.

In one embodiment of the invention, as illustrated in FIG. 2, a screened drain orifice 2, in fluid communication with the upper growth compartment 16 and the reservoir compartment 7, provides drainage of excess fluid from the upper growth compartment 16 to the reservoir compartment 7.

As depicted in FIGS. 3 and 4, a switch 6 can be provided for selectively isolating the pump 4 from power source 5. In particular, the power compartment can be fitted with a conventional switch element, manually actuatable by the user, for selectively activating or deactivating the power unit, such as when the user chooses to manually tend the plant 18.

A transparent window or tube element 8 can be incorporated into the reservoir compartment 7 to permit the user to monitor the level of the selected fluid in the reservoir compartment. The tubing 8 can be constructed of transparent plastic, for providing a perceptible display of the level of fluid contained in the reservoir compartment 7. The reservoir compartment can be refilled as required, typically at two or three month intervals, depending upon the average rate of water usage.

The plant growth chamber 20 can further include an inside vent conduit 9, which permits displacement or venting of air inside the reservoir compartment 7 during filling and pumping operations. This vent conduit 9, in fluid communication with the reservoir compartment 7 and the external atmosphere, prevents a pneumatic lock condition, which would otherwise prevent the selected fluid from draining into the reservoir compartment following irrigation.

Figure 5:
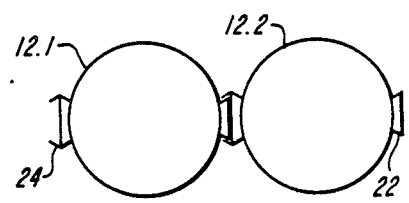
FIG. 5 depicts a plurality of linked plant growth chambers.

Those skilled in the art will appreciate that while FIGS. 1-3 illustrate one practice of the invention, utilizing a conventional plant container modified to provide three compartments, the invention can be practiced in connection with a wide range of enclosure or housing designs. For example, in the embodiment illustrated in FIG. 5, a plurality of housings 12.1, 12.2 are linked by conventional tongue and groove elements 22 and 24, to form an array of plant growth chambers, each containing growth, reservoir, and power compartments as described above in connection with FIGS. 1-3.

As discussed above in connection with FIG. 3, the invention can be practiced in connection with storage batteries 5 for providing power to pump 4. The utilization of storage batteries to provide electrical power allows the system to be self contained. The effective life of the storage batteries is extended because the pump draws electrical power from the storage batteries only when the fluid quantity sensor signals a demand for irrigation, and automatically terminates fluid transport when sufficient irrigation is signalled by the sensor.

In a further preferred embodiment of the invention, the power source 5 includes rechargeable storage batteries and a battery condition indicator 44, which can be, for example, an LED. In order to facilitate recharging of storage batteries 5, a conventional coaxial power connector 11, illustrated in FIG. 3, can be incorporated into the power compartment, for connecting an external power source to the storage battery for recharging. The external power source can include a conventional step-down transformer for converting 120 VAC house current to a selected low DC voltage.

Moreover, the coaxial power connector 11 can be of the type incorporating a conventional interrupter element, so that connecting the external power supply causes the pump 4 to be electrically isolated from the internal storage battery power supply 5, and so that the external power supply is connected directly to the pump 5. If self-contained operation is not required, the invention can therefore be practiced in connection with an external electrical power source.

It will thus be seen that the invention efficiently attains the objects set forth above, among those made apparent from the preceding description. In particular, the invention provides self-contained plant growth systems which operate without external monitoring or external sources of power, which are reliable and convenient to operate and service, and which are compact and robust. The invention is useful in locations such as residences and commercial establishments which have extensive horticultural sites requiring frequent irrigation. The self-contained unit is desirable in plant research, especially in field of hydroponics, and can be adapted for use indoors or outdoors.

It will be understood that changes may be made in the above construction and in the foregoing sequences of operation without departing from the scope of the invention. For example, the vertical ordering of the growth, reservoir and power compartments can be modified so that the reservoir compartment is uppermost. Multiple plant growth chambers can be linked so that irrigation is provided by a single pump. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. Self-contained hydroponic apparatus for automatically irrigating a plant supported in a supporting medium, said apparatus comprising housing means, for defining first, second, and third compartments, said first compartment defining a growth compartment for containing the plant and the supporting medium, said second compartment defining a reservoir compartment for containing a selected liquid, and said third compartment defining a power compartment, said growth, reservoir and power compartments defining upper, intermediate, and lower compartments, respectively, said upper, intermediate, and lower compartments collectively defining a vertical array of compartments, said lower compartment being separated from said upper compartment by said intermediate compartment, liquid sensing means, in communication with said growth compartment, for sensing a selected value of a parameter representative of quantity of liquid in said growth compartment, and for generating a liquid quantity signal representative of said quantity of liquid and selective liquid transport means, responsive to a selected value of said liquid quantity signal, for selectively transporting said selected liquid from said reservoir compartment to said growth compartment, so that liquid transport is automatically initiated when said liquid quantity signal has said selected value, and is automatically terminated when said liquid quantity signal has another value, said selective liquid transport means including electrically powered liquid pump means, disposed within said power compartment, responsive to said selected value of said liquid quantity signal, for initiating said liquid transport, first conduit means, in liquid communication with said reservoir compartment and said pump means, for conducting said selected liquid from said reservoir compartment to said pump, second conduit means, in liquid communication with said pump means and said growth compartment, for conducting said selected liquid from said pump to said growth compartment, electrical power source means, disposed within said power compartment, for supplying electrical power to said pump means, said electrical power source means including storage battery means for storing and delivering electrical power.

2. Apparatus according to claim 1, wherein said parameter is fluid level.

3. Apparatus according to claim 1, wherein said parameter is supporting medium moisture content.

4. Apparatus according to claim 2, wherein said growth compartment includes drainage means, in fluid communication with said growth compartment and said reservoir compartment, for permitting drainage of fluid from said growth compartment to said reservoir compartment.

5. Apparatus according to claim 4, wherein said reservoir compartment includes vent means, in fluid communication with said reservoir compartment and with external atmosphere, for admitting external atmosphere into said reservoir compartment.

6. Apparatus according to claim 1 wherein said storage battery means includes rechargeable storage batteries.

7. Apparatus according to claim 1 wherein said electrical power source means includes electrical coupling means for electrically coupling said pump to an external electrical power source.

8. Apparatus according to claim 7, wherein said electrical coupling means includes a coaxial electrical connector.

9. Apparatus according to claim 1, further comprising switch means for selectively isolating said pump means drol said electrical power source means.

10. Apparatus according to claim 1, wherein said electrical power source means further includes means for indicating a value representative of battery condition.

11. Apparatus according to claim 10, wherein said selected fluid is plant nutrient fluid.

12. Apparatus according to claim 11, wherein said supporting medium is any of soil or vermiculite.

13. Apparatus according to claim 12, further comprising fluid level display means, in fluid communication with said reservoir compartment, for displaying fluid level in said reservoir compartment.

14. Apparatus according to claim 13, wherein said fluid level display means includes an optically transparent element.

15. Apparatus according to claim 14, wherein said housing means further includes modular linkage means for linking a plurality of said housing means to form an array of said housing means.

* * * * *